(12) United States Patent
Van Der Velde

(10) Patent No.: US 10,952,065 B2
(45) Date of Patent: Mar. 16, 2021

(54) TELECOMMUNICATIONS NETWORKS

(71) Applicant: Samsung Electronics Co., Ltd., Suwon-si (KR)

(72) Inventor: Himke Van Der Velde, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/908,052

(22) Filed: Jun. 22, 2020

(65) Prior Publication Data

US 2020/0322783 A1 Oct. 8, 2020

Related U.S. Application Data

(62) Division of application No. 15/934,181, filed on Mar. 23, 2018, now Pat. No. 10,728,742.

(30) Foreign Application Priority Data

Mar. 24, 2017 (GB) .................................. 1704734
Mar. 21, 2018 (GB) .................................. 1804475
Mar. 22, 2018 (GB) .................................. 1804564

(51) Int. Cl.
*H04W 8/22* (2009.01)
*G06F 8/71* (2018.01)
*H04L 5/00* (2006.01)
*G06F 8/65* (2018.01)

(52) U.S. Cl.
CPC ............. *H04W 8/22* (2013.01); *G06F 8/65* (2013.01); *G06F 8/71* (2013.01); *H04L 5/0048* (2013.01)

(58) Field of Classification Search
CPC .......... H04W 8/22; H04L 5/0048; G06F 8/65; G06F 8/71
USPC ....................................................... 455/418
See application file for complete search history.

(56) References Cited

U.S. PATENT DOCUMENTS

| | | | |
|---|---|---|---|
| 9,313,755 B2* | 4/2016 | Chen | H04W 72/048 |
| 2004/0009770 A1* | 1/2004 | Sivanandan | H04W 28/18 455/425 |
| 2006/0282545 A1* | 12/2006 | Arwe | G06F 8/71 709/237 |
| 2012/0008557 A1 | 1/2012 | Wu | |
| 2017/0048756 A1* | 2/2017 | Sunell | H04W 36/0005 |
| 2017/0048839 A1 | 2/2017 | Henttonen et al. | |
| 2017/0086183 A1* | 3/2017 | Yi | H04L 5/0053 |

OTHER PUBLICATIONS

3GPP TS 36.331 V14.1.0 Dec. 2016 (Year: 2016).*
U 3GPP TS 36.331, V14.1.0 (Dec. 2016) (Year: 2016).
V 3GPP TSG-RAN WG2 Meeting #97, R2-170326 (Feb. 2017) (Year: 2017).
3GPP TSG-RAN WG2 Meeting #97, R2-170399 (Feb. 2017) (Year: 2017).

* cited by examiner

*Primary Examiner* — William Nealon
(74) *Attorney, Agent, or Firm* — Jefferson IP Law, LLP

(57) ABSTRACT

Disclosed is a method of operating a telecommunication network, comprising a User Equipment, UE, and a Base Station, BS, wherein the a UE is operable to support a first release of a software standard and is further operable to indicate to the a BS its ability to support at least one feature from a second, later, release of a software standard.

5 Claims, 5 Drawing Sheets

```
InformationElementA-rX ::= SEQUENCE {
    field1-rX                  InformationElement 1-rX            OPTIONAL,   --Need ON
    field2-rX                  InformationElement 2-rX            OPTIONAL,   --Need OR
    field3-rX                  InformationElement 3-rX            OPTIONAL,   --Need OR
}

InformationElementA-rX+N ::= SEQUENCE {
    field1-rX+N                InformationElement 1-rX            OPTIONAL,   --Need ON
    field2-rX+N                InformationElement 2-rX            OPTIONAL,   --Need OR
    field3-rX+N                InformationElement 3-rX+N          OPTIONAL,   --Need OR
    field4-rX+N                InformationElement 4-rX+N          OPTIONAL,   --Need OR
    field5-rX+N                InformationElement 5-rX+N          OPTIONAL,   --Need OR
}

InformationElement3-rX+N ::= SEQUENCE {
    fieldI-rX+N                BOOLEAN,
    fieldII-rX+N               ENUMERATED {n10, n20, n40, n80-vX+N,} OPTIONAL,   --Need OR
    fieldIII-rX+N              InformationElementII-rX+N          OPTIONAL,   --Need OR
}
```

FIG. 1

TELECOMMUNICATIONS NETWORKS

CROSS-REFERENCE TO RELATED APPLICATION(S)

This application is a divisional application of prior application Ser. No. 15/934,181, filed on Mar. 23, 2018, which was based on and claimed priority under 35 U.S.C. § 119(a) of Great Britain patent applications filed on Mar. 24, 2017 in the United Kingdom Intellectual Property Office and assigned Serial number 1704734.1, filed on Mar. 21, 2018 in the United Kingdom Intellectual Property Office and assigned Serial number 1804475.0, and filed on Mar. 22, 2018 in the United Kingdom Intellectual Property Office and assigned Serial number 1804564.1, the entire disclosure of each of which is hereby incorporated by reference.

BACKGROUND

1. Field of the Disclosure

The present invention relates to telecommunication standards and particularly to issues regarding device compatibility with other network elements, when the device in question and the other network elements are operating according to different versions of the standard in question.

And, the present invention relates to the retrieval of the capabilities of a user equipment (UE) in a telecommunication network, In particular, the capabilities relate to specific bands or band combinations (BCs) which a particular UE is able to support, given its hardware and/or firmware configuration. Some UEs may be limited to certain BCs and the network needs to know this when configuring the UE.

2. Description of the Related Art

The device in question is usually a User Equipment (UE) or a mobile device. The other network elements are usually infrastructure elements such as Base Stations (BS).

In the context of this application, a band combination of e.g. B1+B2 means that the UE in question supports simultaneous configuration of a serving cell on band B1 and another serving cell on band B2.

Further, the concept of fallback band combination refers to the ability of a UE to support the fallback that results from releasing an secondary cell (SCell). In the art, fallback band combination is defined as a band combination that would result from another band combination by releasing at least one SCell or uplink configuration of SCell. An intra-band non-contiguous band combination is not considered to be a fallback band combination of an intra-band contiguous band combination.

A problem exists when the release of a software standard for operating a telecommunication network is incremented. For instance, when the release changes from e.g. 5 to e.g. 6, new functionality is introduced, but all UEs operating according to release 5 are still required to operate with BSs operating according to release 6. It is important, for reasons of backward compatibility, that such interoperability is maintained. However, it means that certain new features may not be available to the network, since the UEs operating according to the older release are not able to avail themselves of the new functionality, even if their hardware is supportive of such new features.

Furthermore, declaring support for the later release implies that the UE has to support all functionality that is mandatory to support in this new release (e.g. release 6). In some cases it is, however, desirable to quickly introduce support for a single feature e.g. to solve a problem experienced in the network. In such case, it can be beneficial to avoid also having to support all mandatory functionality defined in the later release. This is referred to in the art as early feature implementation.

When early feature implementation is not used, it is clear which signalling/extensions the UE is required to support i.e. UE should support the entire transfer syntax (ASN.1). Embodiments of the invention aim to clarify the issue for the case of early feature implementation, and to do so in a manner which minimises the additional functionality to be supported by the UE without complicating network operation and signalling overhead.

There therefore exists a need to implement network controls to maximise utilisation of certain hardware resources, while maintaining knowledge of which UEs are operable according to which release and without unnecessarily increasing a signalling overhead in the system.

SUMMARY

According to a first aspect of the invention, there is provided a solution enabling the UE to implement features early even if the feature involves critical ASN.1 extensions. The solution makes it possible for the network to efficiently configure the features supported by the UE without causing interoperability problems and without severely increasing UE implementation complexity.

According to a second aspect of the invention, there is provided a solution to combine two options by which the network, when retrieving capabilities from the UE, can limit the capabilities to be provided i.e. the option to request the UE to not provide capabilities of fallback band combinations and the option to request the UE to indicate for specific capability differences for specific (fallback) combinations. This solution can avoid use of a 2nd step to retrieve UE capabilities as well as the need for the network to transcode capabilities received from the UE in the these steps.

According to the present invention there is provided an apparatus and method as set forth in the appended claims. Other features of the invention will be apparent from the dependent claims, and the description which follows.

Although a few preferred embodiments of the present invention have been shown and described, it will be appreciated by those skilled in the art that various changes and modifications might be made without departing from the scope of the invention.

BRIEF DESCRIPTION OF DRAWINGS

For a better understanding of the invention, and to show how embodiments of the same may be carried into effect, reference will now be made, by way of example only, to the accompanying diagrammatic drawings in which:

FIG. 1 shows information related to an embodiment of the present invention.

DETAILED DESCRIPTION

Figure 2A:
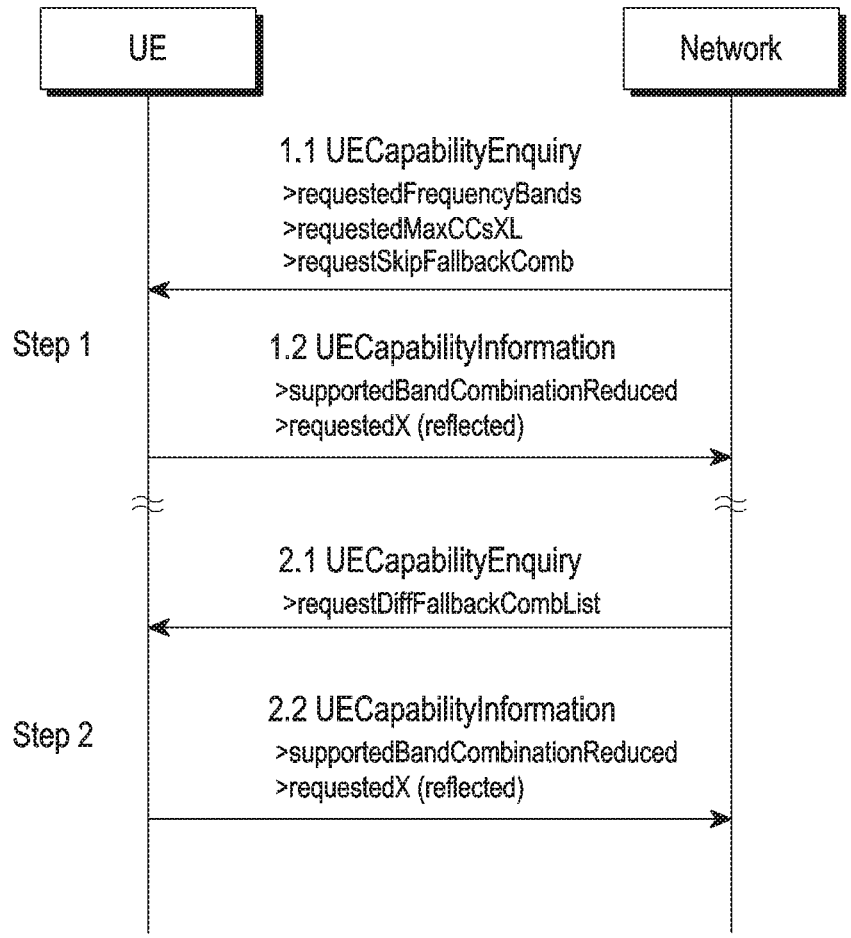
FIG. 2A shows an example message sequence according to the prior art.

A first embodiment of the invention relates to early feature implementation (LTE) and UE requirements regarding ASN.1 comprehension.

The prior art status on early UE implementation is that the UE indicates release X in field accessStratumRelease and supports a feature specified in release X+N Embodiments of the invention relate to a feature implemented early that involves signalling changes (i.e. ASN.1 extensions). Signalling changes may concern broadcast and/or dedicated signalling, and comprise of non-critical and/or critical extensions By way of example, consider the situation where a UE is configured to operate according to a specific release of an operational standard, whereas a more recent release is available and used by at least some UEs in the network. The network operator would generally like as many UEs as possible to operate according to the latest release, since this eases both network planning issues and the need to maintain a degree of backward compatibility.

However, it is not practical for all UEs to operate according to the very latest release and it is inevitable that some will operate according to an earlier release and so will not be able to activate all possible features of later releases.

However, in an embodiment of the invention, a mechanism is provided which allows UEs operating according to an earlier release to implement at least some of the features of the later release. These features may be selected by the network operator on the basis that they offer the greatest advantages in terms of network planning, capacity or some other parameter.

It is not generally possible for the UE operating according to the earlier release to implement all, or even a great number, of the possible features, but according to an embodiment, one or more features can be configured.

In the context of this application, "feature" refers to an operation which may be performed by the UE or a parameter which is set and which controls or influences its operation. For instance, a feature may be the ability to support dual connectivity (DC) or load balancing.

In an earlier release, a feature may be defined as A, having certain parameters associated therewith. In the later release, the feature may be modified to be A', having a different set of parameters associated therewith. The parameters may be completely different or may comprise one or more additional parameters compared to feature A. The requirement to communicate different parameters between the UE and BS in connection with the operation of feature A or A' can affect the signalling required.

In an embodiment of the invention, a UE operable according to an earlier release signals explicitly to the BS which capabilities it is able to support. For instance, the UE may signal to the BS that is supports all the features of a certain release (e.g. release number 8) and a subset of features from a later release (e.g. release number 10). The particular subset is signalled explicitly so that the network knows which features are supported.

The UE signal to the BS that it supports a certain release. This implies that the UE supports all the features that are mandatory to support in that release. A release typically also includes features that are optional to support. For such features, the UE explicitly signals whether it supports the optional features in question.

It is notable that the same signalling is used for features that are mandatory to support but that may not be supported by initial network deployments, meaning that it is not possible to perform interoperability test. That is, in such cases, the signalling again indicates whether the functionality can be utilised (but now merely indicating whether interoperability testing passed).

Based on the release and the supported capabilities as indicated by the UE, the network, via the BS, is then able to configure the UE to perform certain functions, knowing that the UE has explicitly signalled that it is capable of supporting said functions.

In dedicated signalling, critical extensions are sometimes used where a new revision of an information structure (message or information element) is defined that covers the functionality supported by the previous version as well as some additions. For instance, release 10 may include a revision of InformationElementA (i.e. InformationElementA-r10) that the network may use instead of the version present in release 10. For these critical extensions in dedicated signalling, it is not presently very clear what the UE is required to support, in particular concerning ASN.1 comprehension. Embodiments of the present invention aim to address such issues.

Embodiments of the present invention Introduce UE requirements regarding comprehension of critical extensions. These do not increase UE requirements regarding functionality to be supported (i.e. limit additional UE requirements to ASN.1 comprehension).

In other words, the UE, according to an embodiment of the present invention, should support critical extensions from the later release, to the extent required for the feature for which it indicated to the BS that it can support such a feature, but it is not obliged to support other extensions. This avoids the unwanted side-effect that supporting an early implementable feature involves having to support a lot of other enhancements not related to the early implementable feature. On the other hand, the network should still be able to use these critically extended information structures to configure all features supported by the UE, Embodiments of the present invention offer the following advantages:

Avoid interoperability problems

Enable network to (re-)configure all features supported by the UE with a single message Limited UE impact According to an embodiment, the UE shall comprehend the entire transfer syntax (ASN.1) of release X. However, it is not required to support functionality associated with every field/every part of the transfer syntax e.g. fields associated of optional features. This allows the UE to explicitly indicate to the BS which features it is able to implement.

The UE shall comprehend the parts of the transfer syntax (ASN.1) of release X+N:

Parts that are related to the feature implemented early e.g. the ASN.1 parts related to indicating feature support (in UE capabilities), the ASN.1 parts related to configuration of the feature Parts related to other features supported by the UE The second point above is further clarified as follows and by reference to FIG. 1.

The UE supports the features associated with fields 1, 3 and 5 of InformationElement1. Field 5 concerns the feature implemented early. i.e. the feature which the UE has explicitly signalled to the BS that it is able to support.

The UE shall support configuration of all supported features by InformationElement1-rX+N.

If one of the supported features was modified between release X and X+N, the UE is not required to support any functionality introduced after release X. Again, this is because the UE is only able to implement features which it has specifically indicated to the BS.

So, in summary, the UE shall comprehend fields 1, 3 and 5 but for field 3 it is not required to support any additional functionality introduced after release X, nor the associated signalling (e.g. an additional code-point or an additional sub-field of InformationElement3–rX+N, as shown in the final line of the example shown in FIG. 1).

To illustrate this, assume that field 3 is used to configure feature M. The UE that signals support for release X is only required to support feature M as defined in that release i.e. it is not required to support the extensions introduced in later releases.

Then assume that field 5 is used to configure early implementable feature P that was introduced in release X+M. A UE indicating support of feature P obviously has to support the revised (critically extended) version of in InformationElementA that is used to configure this feature (i.e. InformationElementA–rX+N). It should support (re-)configuration of feature M by the same revision of InformationElementA. The UE is however not required to support the enhancements (and the associated signalling extensions) of feature M that were introduced after release X.

An embodiment of the present invention relates to UE capability retrieval.

On Uu, a request for skipping fallback combinations (requestSkipFallbackComb) cannot include a request to report fallback Band Combinations (BCs) which capabilities are different (requestDiffFallbackCombList). The two requests can however be done sequentially i.e. to request requestSkipFallbackComb first as illustrated in FIG. 1. It is further noted that both are supported only with new optimised format for indicating supported bands (i.e. as by supportedBandCombinationsReduced).

If requestDiffFallbackCombList is requested, the UE only reports capabilities for a subset of the BCs listed in the request:

Include the subset of the requested BCs that are supported by the UE

Remove fallback combinations which capabilities are the same as its root

It is an aim of embodiments of the invention to provide good mobility support for the case of heterogenous network deployments i.e. networks comprising of nodes with equal functionality. It should be possible to pass the capabilities received from the UE when the request included requestDiffFallbackCombList to a target supporting the mechanism. Otherwise each node will again have to request UE to provide fallback BCs which capabilities are different (requestDiffFallbackCombList)

Embodiments of the invention aim to avoid using 2 steps on radio interface and simplify network operation i.e. the need to transcode. The UE capabilities upon transferring these to another (target) network node.

In terms of backwards compatibility between network nodes on S1/X2, it is not possible to separately forward the responses to the two non-combinable requests received from the UE (as in FIG. 2A), because in the RRC container on S1/X2 there is only one field that can carry the reduced format.

Upon transferring the capabilities to a target eNB, the Source eNB thus has to re-code and build a combination from the two responses from the UE. Such combination should probably be passed to a target eNB supporting the new functionality (other eNBs may not accept it and/or behave unexpectedly)

A further problem is possible sub-optimal procedures on Uu:

in that it is not possible to request the UE to report differences for a few BCs (that are of main interest) while using skipping of fallback combinations for other (less interesting) BCs. Requesting (requestDiffFallbackCombList in a second step has a slight advantage that eNB can take into account information regarding differences reported by UE in the first step. Avoiding the limitation may furthermore simplify the procedural specification In order to address the above mentioned problems, embodiments of the invention introduce the option to use a one step procedure i.e. allow the eNB to include both requestSkipFallbackComb and requestDiffFallbackCombList in the same UECapabilityEnquiring message (i.e. using a single step), thereby reducing the amount of signalling required as well as reducing latency.

This is provided as an additional option i.e. eNB can still use two steps as well, if this is preferred.

This is merely for Uu, since on S1/X2 it is not possible to have separate signalling.

Embodiments of the invention have the following advantages:

Obtain differences of relevant BCs without losing benefits of fallback

Unification of the procedure i.e. simplified handling of the requests by the UE

Figure 2B:
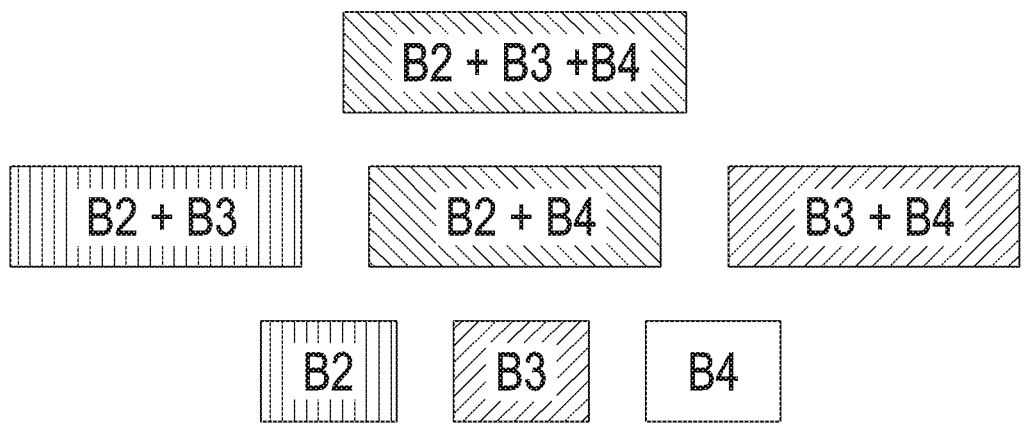
FIG. 2B shows various band configurations for illustrating operation of an embodiment of the invention.
Figure 3:
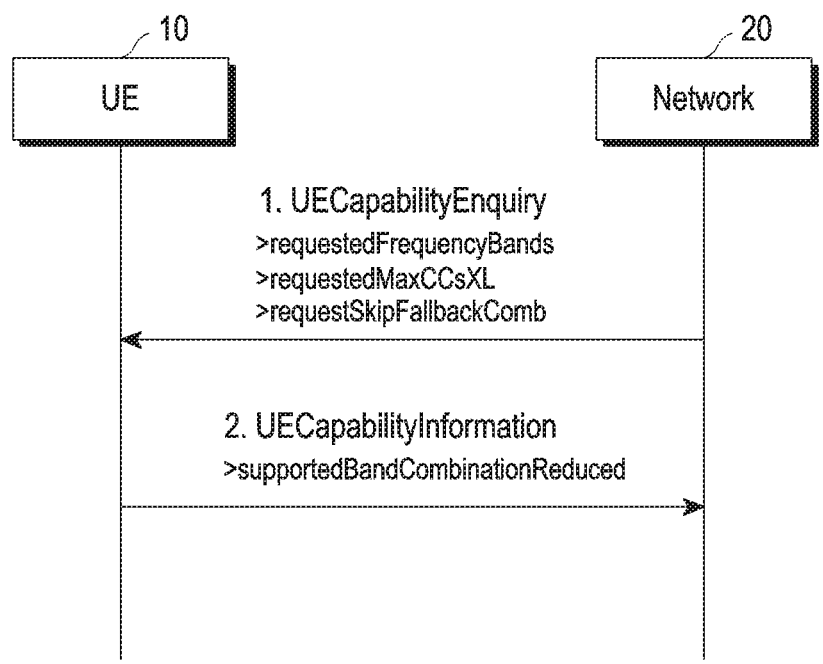
FIG. 3 shows an example message sequence according to an embodiment of the present invention.

In order to illustrate an embodiment of the invention, reference is made to FIGS. 2A, 2B, and 3 and the following.

The invention is illustrated by an example comprising a network and a UE supporting certain bands and band combinations, also shown In this example, the network employs bands B2-B6, upto 3 downlink (DL) bands and in particular B2+B3+B4 as well as B4+B5+B6. Only for fallback combinations of these, the network wants to know the full capabilities, if different. The network may or may not forward this difference information to some neighbouring nodes.

In this example, the UE supports B1-B5 as well as several band combinations comprising 3 downlink bands. This means that the UE can physically (i.e. using its hardware and controlling firmware) support the bands and combinations in question.

FIG. 2A shows a Sequence description (using a 2 step approach) as known in the prior art. The numbering shown below tallies with the messages that are used in FIG. 2A.

1.1: The network requests UE capabilities for the bands it supports (i.e. requestedFrequencyBands set to B2-B6), with requestedMaxCCsXL set to request BCs with upto 3DL+1UL and requestSkipFallbackComb set.

1.2 The UE responds and provides the corresponding supported band combinations.

In this case, the UE indicates that for the following BCs, fallback combinations have different capabilities: B2+B3+B4, B3+B4+B5.

Messages 1.1 and 1.2 make up Step 1. The following messages 2.1 and 2.2 make up Step 2 in the 2 step approach.

2.1: The network requests the UE to report differences for B2+B3+B4 i.e. by field requestDiffFallbackCombList.

2.2: For this BC, as indicated in requestDiffFallbackCombList, the UE reports the fallback BCs which have capabilities different from the one which they are fallback from There follows a description of an embodiment of the invention, utilising a 1-step approach. The 1-step approach is shown in FIG. 3 and involved a single message in each direction between the UE 10 and the network 20.

1: The network includes the 3 fields as shown in 1.1 in FIG. 2A and the single field as in 2.1 in FIG. 2A i.e. the network explicitly includes requestDiffFallbackCombList as well as requestSkipFallbackComb 2: The UE reports supported BC in response. The UE omits some fallback combinations but not for the ones for which network explicitly requests difference reporting In the example shown, the UE indicates that for following BCs, fallback combinations have different capabilities: B2+B3+B4, B3+B4+B5

The UE omits fallback combinations of B3+B4+B5 while it reports fallback combinations of B2+B3+B4, as this BC is again included in requestDiffFallbackCombList, which has capabilities different from the one which they are fallback from.

In FIG. 3, the same shading indicates that the associated capabilities are the same. Therefore, for clarity, B2 has the same capabilities as B2+B3; B2+B4 has the same capabilities as B2+B3+B4; and B3 has the same capabilities as B3+B4.

In this example only B2+B4 has the same capabilities as B2+B3+B4 and hence would be the only combination that is omitted.

An embodiment of the present invention has the advantage of reducing signalling overhead in the circumstances set out. In other words, fallback combinations are not reported, except for those which the network really needs to know about.

Figure 4:
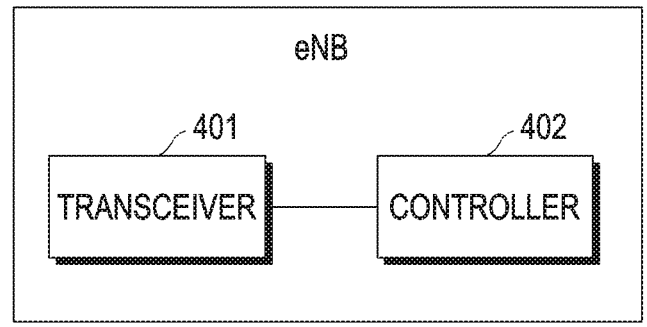
FIG. 4 is a block diagram of an eNB (base station, BS) for performing an embodiment of the present disclosure.

FIG. 4 is a block diagram of an eNB (base station, BS) for performing an embodiment of the present disclosure.

Referring to FIG. 4, the eNB may include a transceiver 401 and a controller 402, and the controller 402 performs a series of operations for transmission point change or path switch according to at least one of the above-described embodiments of the present disclosure. The transceiver 401 performs an operation of transmitting and receiving signaling, a signal, and a message for transmission point change or path switch according to at least one of the above-described embodiments of the present disclosure under control of the controller 402. The eNB according to an embodiment of the present disclosure may further include a storage unit that stores various data, information, and parameters generated in the transceiver 401 and the controller 402.

Figure 5:
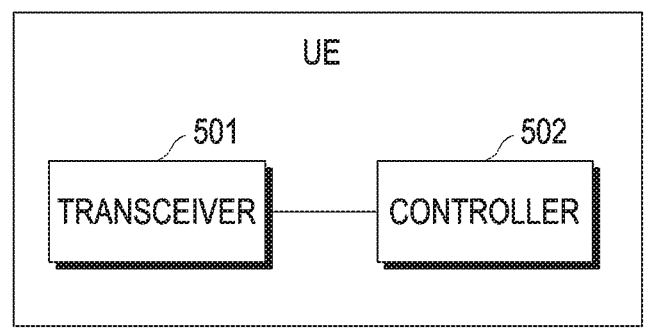
FIG. 5 is a block diagram of a UE for an embodiment of the present disclosure.

FIG. 5 is a block diagram of a UE for an embodiment of the present disclosure.

Referring to FIG. 5, the eNB may include a transceiver 501 and a controller 502, and the controller 502 performs a series of operations for transmission point change or path switch according to at least one of the above-described embodiments of the present disclosure. The transceiver 501 performs an operation of transmitting and receiving signaling, a signal, and a message for transmission point change or path switch according to at least one of the above-described embodiments of the present disclosure under control of the controller 502. The eNB according to an embodiment of the present disclosure may further include a storage unit that stores various data, information, and parameters generated in the transceiver 501 and the controller 502.

Various embodiments of the present disclosure may be implemented with a computer-readable code on a computer-readable recording medium. The computer readable recording medium may be any type of data storage device that may store data readable by a computer system. Examples of record-mediums readable by the computer may include a read-only memory (ROM), a random-access memory (RAM), compact disk ROM (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such software may be stored, whether or not erasable or re-recordable, in a volatile or non-volatile storage such as a read-only memory (ROM), a memory such as a random-access memory (RAM), a memory chip, a device, or an integrated circuit; and an optically or magnetically recordable and machine (e.g., computer)-readable storage medium such as a compact disc (CD), a digital versatile disk (DVD), a magnetic disk, or a magnetic tape. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Accordingly, the present invention includes a program that includes a code for implementing the apparatus and method set forth in the appended claims of the specification and a machine (computer, etc.) readable storage medium for storing the program. The program may be electronically transferred through an arbitrary medium such as a communication signal delivered through a wired or wireless connection, and the present disclosure properly includes equivalents thereof.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

Meanwhile, embodiments disclosed in the present specification and drawings have been provided to easily describe the present disclosure and to help understanding of the present disclosure, and are not intended to limit the scope of the present disclosure. While the foregoing embodiments of the present disclosure have been shown and described as examples, it will be apparent to those of ordinary skill in the art that modifications and variations can be made without departing from the spirit and scope of the embodiments as defined by the appended claims. Therefore, the true technical scope of the present disclosure should be defined by the appended claims.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A User Equipment (UE) in a telecommunication network, the UE comprising:
   a transceiver; and
   a processor configured to:
      determine to support at least one functionality defined in a release of specifications corresponding to an access stratum release that the UE indicates to a base station, and
      determine to support an additional configuration of an implemented feature,
   wherein the implemented feature is defined in a release later than the access stratum release indicated by the UE,
   wherein the implemented feature involves support of a revised version of a message or a field, and
   wherein the determination to support the additional configuration comprises supporting an enhancement of the implemented feature after the release that is later than the access stratum release indicated by the UE.

2. The UE of claim 1, wherein the UE is required to determine to support use of the revised version of the message or the field for configuration of features supported by other than the implemented feature, in accordance with what is defined in the access stratum release indicated by the UE.

3. A method performed by a user equipment (UE), the method comprising:
   determining to support at least one functionality defined in a release of specifications corresponding to an access stratum release that the UE indicates to a base station; and
   determining to support an additional configuration of an implemented feature,
   wherein the implemented feature is defined in a release later than the access stratum release indicated by the UE,
   wherein the implemented feature involves support of a revised version of a message or a field, and
   wherein the determining to support the additional configuration comprises supporting an enhancement of the implemented feature after the release that is later than the access stratum release indicated by the UE.

4. The method of claim 3, wherein the UE is required to determine to support use of the revised version of the message or the field for configuration of features supported by other than the implemented feature, in accordance with what is defined in the access stratum release indicated by the UE.

5. The UE of claim 1, wherein the at least one functionality comprises requestedFrequencyBands, requestedMaxCCsXL, or requestSkipFallbackComb.

* * * * *